A. P. KEEGAN.
CHAIN HOLDING HOOK.
APPLICATION FILED MAR. 20, 1915.

1,173,001.

Patented Feb. 22, 1916.

Witness.
E. C. Duffy

Inventor
A. P. Keegan
By James J. Sheehy & Co.,
Attorneys

UNITED STATES PATENT OFFICE.

ALBERT P. KEEGAN, OF PROVIDENCE, RHODE ISLAND.

CHAIN-HOLDING HOOK.

1,173,001.  Specification of Letters Patent.  Patented Feb. 22, 1916.

Application filed March 20, 1915. Serial No. 15,726.

*To all whom it may concern:*

Be it known that I, ALBERT P. KEEGAN, a citizen of the United States, residing at Providence, in the county of Providence and State of Rhode Island, have invented new and useful Improvements in Chain-Holding Hooks, of which the following is a specification.

My present invention pertains to devices for holding chains on the wheels of motor vehicles; and it consists in the peculiar and advantageous device, hereinafter described and claimed, through the medium of which a chain may be expeditiously and securely fastened on a wheel without liability of casual release from any cause whatsoever.

Figure 1:
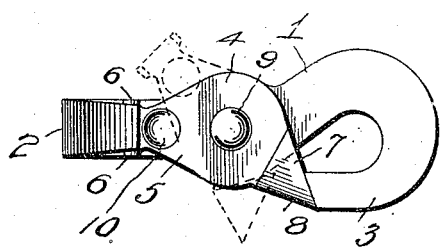
Figure 2:
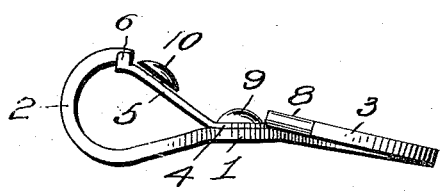
Figure 3:
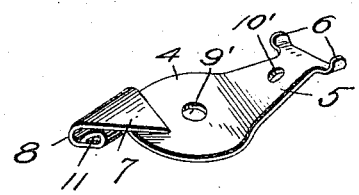

In the accompanying drawings which are hereby made a part hereof: Figure 1 is a plan view of my novel device. Fig. 2 is a front elevation of the same. Fig. 3 is a perspective of the tongue of the device *per se*.

Similar numerals of reference designate corresponding parts in all of the views of the drawings.

The body 1 of my novel device is provided at its opposite ends with hooks 2 and 3; the hook 2 being bent at a right angle to the plane of the greatest width of the body, while the hook 3 rests in approximately the same plane as the greatest width of the body as will be seen by comparison of Figs. 1 and 2. In other words the mouths of the hooks are disposed at right angles to each other.

Pivotally connected through the medium of a rivet 9 or any other suitable pintle to the body 1 is a swinging tongue 4 of resilient metal. The said tongue 4 comprises an arm 5 bearing a headed stud 10 and provided at its free end and on its side edges with upwardly reaching lugs 6. As shown in Fig. 3 the tongue 4 is provided with an aperture 9' for the passage of the pintle 9, and is also provided with an aperture 10' for the reception of the stem of the stud 10. At the opposite side of the pintle 9 with reference to the arm 5, is an arm which is bent upon itself, as indicated by 7, 8 and 11 to form a stiff and strong reinforcement, designed and adapted when the tongue is in closed position to rest opposite and adjacent the free end of the hook 3 and thereby close the mouth of the said hook in a strong manner. Edgewise movement of the tongue about the pintle 9 is necessary in order to open the mouths of the two hooks 2 and 3, and when the tongue is closed as shown in Fig. 2 and by full lines in Fig. 1, it will be observed that the lugs 6 rest at opposite sides of the hook 2 and preclude edgewise movement of the tongue. From this it follows that as a condition precedent to the edgewise moving of the tongue 4, the arm 5 of said tongue must be pressed inwardly or toward the shank of the hook 2 so as to disengage the lugs 6 from the hook and so as to enable the said lugs to clear the hook end incidental to the swinging of the tongue as a whole. It also follows that the arm 5 must be pressed toward the shank of the hook during the closing of the tongue, and when said arm 5 is in line with the hook 2 and the mouths of the hooks are closed, it is simply necessary to relieve the arm 5 of pressure whereupon by reason of the resiliency of the arm the lugs 6 will be caused to assume positions at opposite sides of the end of the hook 2. With this done the tongue 4 will of itself be strongly secured in its closed position, and this in such manner that pull or pressure from within against either arm of the tongue will not tend to unlock the tongue. The headed stud 10 forms a convenient thumb piece, and the said headed stud may also be utilized when desired, for the attachment of a cable or the like with which the device may be connected with the wheel.

It will be gathered from the foregoing that while simple, inexpensive and compact in construction, my novel device is adapted to be expeditiously and easily manipulated, and is reliable for the purpose stated and well able to withstand the rough usage to which devices of corresponding character are ordinarily subjected.

Having described my invention, what I claim and desire to secure by Letters Patent, is:—

A holding device, comprising a flat body having an inwardly directed hook at one end and also having at its opposite end a lateral hook that rests in approximately the same plane as the adjacent portion of the body and has its free end deflected from said plane; and a tongue superimposed on and pivotally connected to the body and having an arm movable parallel to the body and arranged to be opposed to the deflected end of the second-named hook and to close the mouth of said hook and also having a resilient arm movable opposite the body and between the same and the end of the first-named hook and provided with means for coöperating with the hook to prevent movement of the tongue parallel to the body until after the resilient arm is pressed toward the body.

In testimony whereof I have hereunto set my hand in presence of two subscribing witnesses.

ALBERT P. KEEGAN.

Witnesses:
E. EUGENE CHESEBRO,
ELMER F. SEABURY.